US012752675B2

(12) United States Patent
Uno

(10) Patent No.: US 12,752,675 B2
(45) Date of Patent: Oct. 6, 2026

(54) SEAT SUPPORT DEVICE

(71) Applicant: TOYOTA JIDOSHA KABUSHIKI KAISHA, Toyota (JP)

(72) Inventor: Koki Uno, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 18/825,160

(22) Filed: Sep. 5, 2024

(65) Prior Publication Data

US 2024/0424960 A1 Dec. 26, 2024

(30) Foreign Application Priority Data

Dec. 25, 2023 (JP) ................................ 2023-218329

(51) Int. Cl.

*B60N 2/14* (2006.01)
*B60N 2/02* (2006.01)
*B60N 2/06* (2006.01)

(52) U.S. Cl.

CPC ........... *B60N 2/14* (2013.01); *B60N 2/02253* (2023.08); *B60N 2/06* (2013.01)

(58) Field of Classification Search

CPC ......... B60N 2/14; B60N 2/06; B60N 2/02253
USPC ..................................................... 297/344.11
See application file for complete search history.

(56) References Cited

U.S. PATENT DOCUMENTS

| | | | | |
|---|---|---|---|---|
| 8,245,994 B2 * | 8/2012 | Yamada | B60N 2/073 297/344.11 |
| 8,733,725 B2 * | 5/2014 | Kimura | B60N 2/0705 296/65.13 |
| 8,888,185 B2 * | 11/2014 | Liao | A47C 1/00 248/346.03 |
| 2010/0253123 A1 * | 10/2010 | DeCraene | B60N 2/062 297/344.21 |
| 2016/0144745 A1 * | 5/2016 | Saucier | B60N 2/02246 248/645 |
| 2016/0264024 A1 * | 9/2016 | Michels | B60N 2/0825 |
| 2018/0215290 A1 * | 8/2018 | Varcus | B60N 2/42709 |
| 2018/0345824 A1 * | 12/2018 | Akimoto | F16C 1/12 |
| 2019/0248263 A1 * | 8/2019 | Nagatomi | A47B 5/04 |

(Continued)

FOREIGN PATENT DOCUMENTS

| | | |
|---|---|---|
| JP | S58-097040 U | 7/1983 |
| JP | 2012-166772 A | 9/2012 |

(Continued)

*Primary Examiner* — Jose V Chen
(74) *Attorney, Agent, or Firm* — SoraIP, Inc.

(57) ABSTRACT

A base member, a first swinging member, and a second swinging member to which a seat of the vehicle is fixed. One of the base member and the first swinging member includes two first rail portions extending in a first direction, and the other of the base member and the first swinging member rotatably supports a plurality of first rollers, and one of the first swinging member and second swinging member includes two second rail portions extending in a second direction, and the other of the 1 and second swinging members rotatably supports a plurality of second rollers. The first rollers respectively support a lower portion, an upper portion, and a side portion of each of the two first rail portions, and the second rollers respectively support a lower portion, an upper portion, and a side portion of each of the two second rail portions.

5 Claims, 6 Drawing Sheets

(56) References Cited

U.S. PATENT DOCUMENTS

| | | | | |
|---|---|---|---|---|
| 2020/0317091 | A1* | 10/2020 | Aktas | B60N 2/02246 |
| 2020/0369178 | A1* | 11/2020 | Maloney | B60N 2/01 |
| 2021/0003247 | A1* | 1/2021 | Nobutoki | B60N 2/1864 |
| 2021/0070197 | A1* | 3/2021 | Haller | B60N 2/067 |
| 2021/0155121 | A1* | 5/2021 | Byun | B60N 2/0244 |
| 2022/0032823 | A1* | 2/2022 | Mochizuki | B60N 2/075 |
| 2023/0015236 | A1* | 1/2023 | Okumura | B60R 16/027 |
| 2023/0020082 | A1* | 1/2023 | Lee | B60N 2/06 |
| 2023/0294565 | A1* | 9/2023 | Li | B60N 2/02246 |
| 2023/0382274 | A1* | 11/2023 | Mochizuki | B60N 2/02246 |
| 2023/0415618 | A1* | 12/2023 | Mizuno | B60N 2/06 |
| 2024/0140283 | A1* | 5/2024 | Aller | B60N 2/06 |
| 2024/0253530 | A1* | 8/2024 | Raybern | B60N 2/146 |
| 2024/0399939 | A1* | 12/2024 | Miyoshi | B60N 2/06 |
| 2025/0018839 | A1* | 1/2025 | Kim | B60N 2/68 |
| 2025/0115171 | A1* | 4/2025 | Lee | B60N 2/20 |
| 2025/0118991 | A1* | 4/2025 | Yamamoto | B60N 2/90 |

FOREIGN PATENT DOCUMENTS

| | | |
|---|---|---|
| JP | 2015-131605 A | 7/2015 |
| JP | 2019-156143 A | 9/2019 |

* cited by examiner

SEAT SUPPORT DEVICE

CROSS-REFERENCE TO RELATED APPLICATION

This application claims priority to Japanese Patent Application No. 2023-218329 filed on Dec. 25, 2023, incorporated herein by reference in its entirety.

BACKGROUND

1. Technical Field

The present disclosure relates to a seat support device.

2. Description of Related Art

There is a seat support device that swingably supports a seat of a vehicle in a prescribed direction. The seat support device includes a base member fixed to a floor side of the vehicle, a support member that supports the seat, and a plurality of balls disposed between the base member and the support member. By having the plurality of balls rotate, the support member swings in a prescribed direction with respect to the base member (for example, refer to Japanese Unexamined Patent Application Publication No. 2019-156143 (JP 2019-156143 A)).

SUMMARY

In the technology, the base member or the support member and the balls make point contact. Accordingly, the ball wears out and the diameter of the balls becomes smaller, and there is a risk of the swinging of the seat becoming unstable. Moreover, a position of the support member with respect to the base member deviates in a direction other than a swinging direction, and there is a risk of the swinging of the support member with respect to the base member becoming unstable.

Accordingly, the present disclosure has an objective of providing a seat support device in which stable swinging of a seat is secured.

The objective can be achieved by a seat support device that includes a base member, a first swinging member, and a second swinging member to which a seat of a vehicle is fixed, in which one of the base member and the first swinging member includes two first rail portions that extend in a first direction, the other one of the base member and the first swinging member rotatably supports a plurality of first rollers that swingably supports the two first rail portions in the first direction, one of the first swinging member and the second swinging member includes two second rail portions extending in a second direction different to the first direction, the other one of the first swinging member and the second swinging member rotatably supports a plurality of second rollers that swingably supports the two second rail portions in the second direction, the first rollers respectively support a lower portion, an upper portion, and a side portion of each of the two first rail portions, and the second rollers respectively support a lower portion, an upper portion, and a side portion of each of the two second rail portions.

In the configuration, the seat support device may further include a first motor supported by the base member, and a second motor supported by the first swinging member, in which the first swinging member may include a first gear portion to which power is transmitted from the first motor and that extends along the first direction, and the second swinging member may include a second gear portion to which power is transmitted from the second motor and that extends along the second direction.

In the configuration, the base member and the first swinging member may each be frame shaped, the first motor may be encased by the base member, the second motor may be encased by the first swinging member, first rollers that respectively support the side portions of the two first rail portions may be positioned between the two first rail portions or may be positioned such that the first rollers sandwich the two first rail portions, and second rollers that respectively support the side portions of the two second rail portions may be positioned between the two second rail portions or may be positioned such that the second rollers sandwich the two second rail portions.

In the configuration, the first rollers may include a side portion roller that supports the side portion of the first rail portion, the first direction may be a circular arc direction centered on a prescribed position, and when the first rail portion and the side portion roller are seen from a direction orthogonal to a surface that includes the first direction, the side portion roller may be retracted from a center line that passes through a center of the first rail portion and the prescribed position in the first direction, and an axial center of the side portion roller may be inclined with respect to the center line so as to approach the center line with an approach to the prescribed position along the axial center.

In the configuration, the base member may rotatably support the first rollers, the first swinging member may include the two first rail portions and rotatably support the second rollers, and the second swinging member may include the two second rail portions.

According to the present disclosure, a seat support device can be provided in which stable swinging of a seat is secured.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of Seat Support Device

Figure 1:
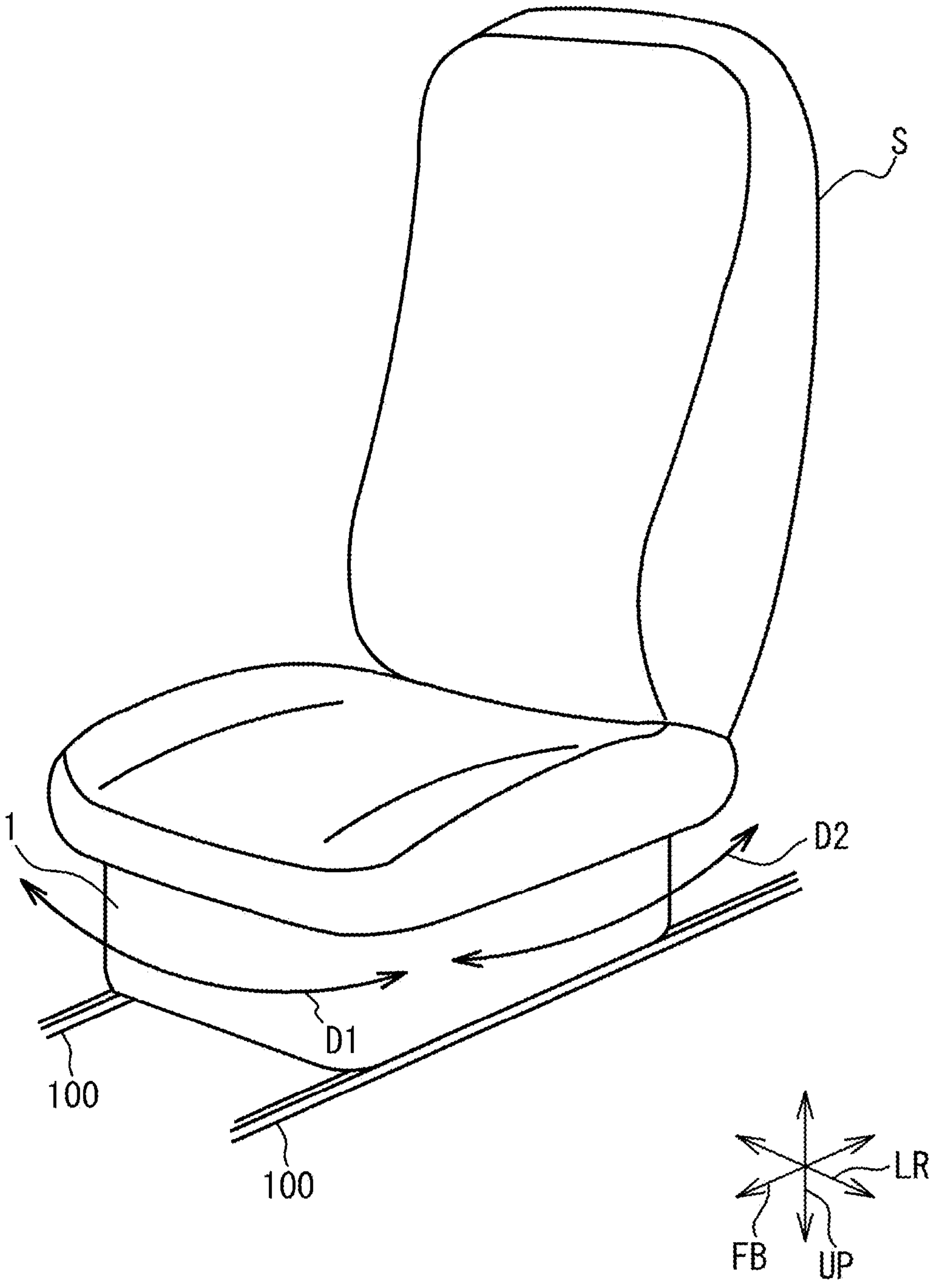
FIG. 1 is a schematic illustration of a seat support device.

FIG. 1 is a schematic explanatory view of a seat support device 1. A seat S is fixed to an upper portion of the seat support device 1. The seat support device 1 is slidable in the front-rear direction FB of the vehicle on a rail 100 fixed to the floor of the vehicle. The seat support device 1 swingably supports the seat S in the first direction D1 and the second direction D2. The first direction D1 is along the left-right direction LR and is a circular arc direction centered at a predetermined position above the seat support device 1. The second direction D2 is along the front-rear direction FB of the vehicle, and is a circular arc direction centered at a predetermined position above the seat support device 1. When the seat support device 1 is viewed from the vertical direction UP, the first direction D1 and the second direction D2 are substantially perpendicular to each other.

Figure 2:
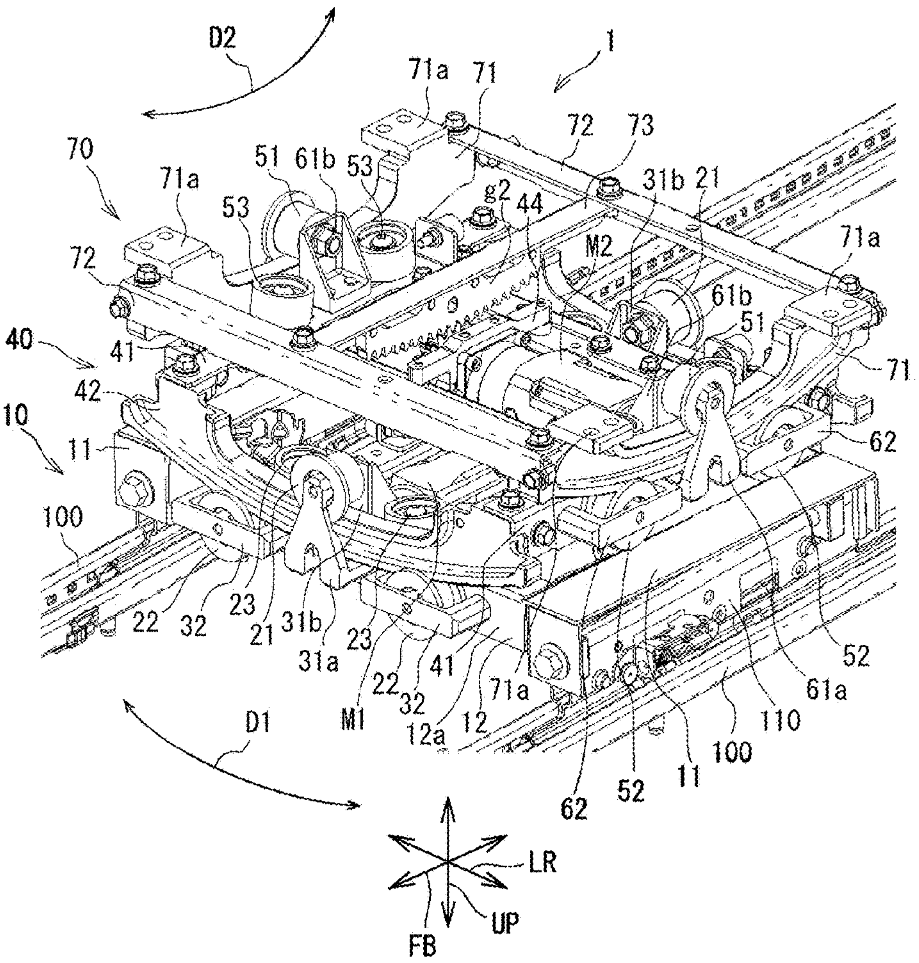
FIG. 2 is a perspective view of a seat support device.

FIG. 2 is a perspective view of the seat support device 1. The seat support device 1 includes a base member 10, a first swinging member 40, and a second swinging member 70. The base member 10 is supported on the rail 100 so as to be slidable in the front-rear direction FB. Specifically, the slider 110 is slidably engaged with the rail 100. The base member 10 is fixed to the slider 110. The base member 10 supports the first swinging member 40 so as to be swingable in the first direction D1. The first swinging member 40 swingably supports the second swinging member 70 in the second direction D2. Thus, the seat support device 1 swingably supports the seat S in the first direction D1 and the second direction D2.

Configuration of Base Member

Figure 3:
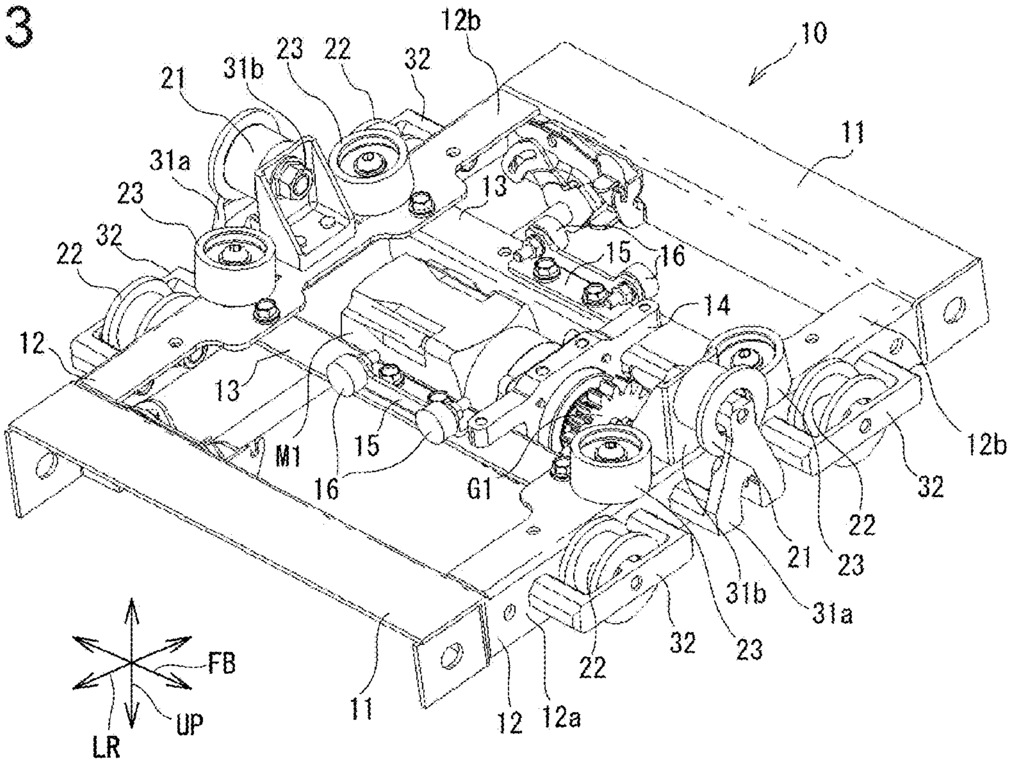
FIG. 3 is an external perspective view of the base member.

FIG. 3 is an external perspective view of the base member 10. The base member 10 includes two support members 11 and two support members 12. The support members 11 and 12 are made of, for example, metal, but are not limited thereto. The two support members 11 are spaced apart from each other in the left-right direction LR and extend along the front-rear direction FB. The two support members 12 are spaced apart from each other in the front-rear direction FB and extend along the left-right direction LR. The two support members 11 and the two support members 12 are connected so that the base member 10 has a frame shape. The support members 12 extend in an L-shape. The support members 12 each include a side wall portion 12*a* and an upper wall portion 12*b*. The upper wall portion 12*b* is bent substantially at right angles to the side wall portion 12*a* from above the side wall portion 12*a* toward the inside of the base member 10.

Each of the two support members 12 is rotatably supported by one upper roller 21, two lower rollers 22, and two side portion rollers 23. Each of the upper roller 21, the lower rollers 22, and the side portion rollers 23 has a cylindrical shape. The upper roller 21 is rotatably supported by a bracket 31*a* fixed to the side wall portion 12*a* and a bracket 31*b* fixed to the upper wall portion 12*b*. The lower rollers 22 are rotatably supported by the side wall portion 12*a* by brackets 32 fixed to the side wall portion 12*a*. The two lower rollers 22 are spaced apart from each other in the left-right direction LR. The side portion roller 23 is rotatably supported by the upper wall portion 12*b*. The two side portion rollers 23 are spaced apart from each other in the left-right direction LR. The respective axial centers of the upper roller 21 and the lower rollers 22 are along the front-rear direction FB. The upper roller 21 and the lower rollers 22 are separated from each other in the vertical direction UP. The respective axial centers of the two side portion rollers 23 are inclined with respect to the vertical direction UP, which will be described in detail later. The upper roller 21, the lower rollers 22, and the side portion rollers 23 are examples of the first roller.

Two beam members 13 are attached between the two support members 12. The beam members 13 are made of metal, for example, but are not limited thereto. The two beam members 13 are separated from each other in the left-right direction LR and extend along the front-rear direction FB. The frame-shaped base member 10 is prevented from being distorted by the beam members 13. A holding member 14 is fixed to the two beam members 13. The holding member 14 supports the first motor M1. A pinion gear G1 is fixed to a distal end of the first motor M1. The rotational shaft of the first motor M1 is along the front-rear direction FB. An L-shaped plate 15 is fixed to each of the two beam members 13. Two rubber members 16 are attached to the L-shaped plate 15.

The driving of the first motor M1 and the second motor M2 to be described later is controlled by the seat ECU (Electronic Control Unit).

Configuration of First Swinging Member

Figure 4:
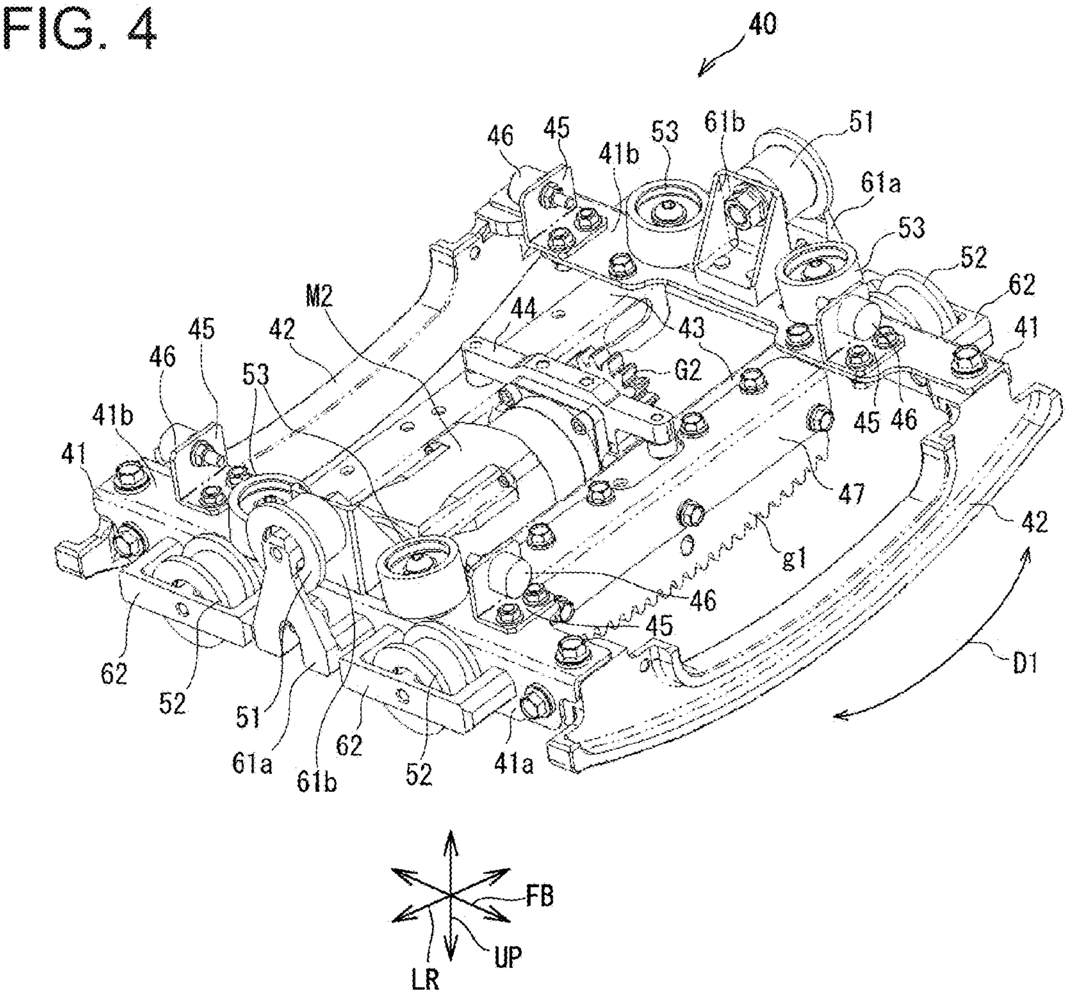
FIG. 4 is an external perspective view of the first swinging member.

FIG. 4 is an external perspective view of the first swinging member 40. The first swinging member 40 includes two support members 41 and two rail portions 42. The support members 41 and the rail portions 42 are made of, for example, metal, but are not limited thereto. The two support members 41 are spaced apart from each other in the left-right direction LR and extend along the front-rear direction FB. The two rail portions 42 are spaced apart from each other in the front-rear direction FB and extend along the left-right direction LR. The two support members 41 and the two rail portions 42 are connected to each other so that the base member 10 has a frame shape.

Each of the two rail portions 42 extends in an arc shape along the first direction D1 shown in FIG. 1. The rail portion 42 is supported by one upper roller 21, two lower rollers 22, and two side portion rollers 23 illustrated in FIG. 3 so as to be swingable in the first direction D1. The rail portion 42 is an example of a first rail portion. Further, when any one of the two support members 41 contacts the rubber member 16 shown in FIG. 3, the swinging range of the first swinging member 40 in the first direction D1 with respect to the base member 10 is defined.

The support members 41 extend in an L-shape. The support members 41 each include a side wall portion 41*a* and an upper wall portion 41*b*. The upper wall portion 41*b* is bent substantially at right angles to the side wall portion 41*a* from above the side wall portion 41*a* toward the inside of the first swinging member 40.

Each of the two support members 41 is rotatably supported by one upper roller 51, two lower rollers 52, and two side portion rollers 53. Each of the upper roller 51, the lower rollers 52, and the side portion rollers 53 has a cylindrical shape. The upper roller 51 is rotatably supported by a bracket 61*a* fixed to the side wall portion 41*a* and a bracket 61*b* fixed to the upper wall portion 41*b*. The lower rollers 52 are rotatably supported by the side wall portion 41*a* by brackets 62 fixed to the side wall portion 41*a*. The two lower rollers 52 are spaced apart from each other in the front-rear direction FB. The side portion rollers 53 are rotatably supported by the upper wall portion 41*b*. The two side portion rollers 53 are spaced apart from each other in the front-rear direction FB. The respective axial centers of the upper roller 51 and the lower rollers 52 are along the left-right direction LR. The upper roller 51 and the lower rollers 52 are separated from each other in the vertical direction UP direction. The respective axial centers of the two side portion rollers 53 are inclined with respect to the vertical direction UP. The upper roller 51, the lower rollers 52, and the side portion rollers 53 are examples of the second roller.

Two beam members 43 are attached between the two support members 41. The beam members 43 are made of metal, for example, but are not limited thereto. The two beam members 43 are separated from each other in the front-rear direction FB and extend along the left-right direction LR. Distortion of the frame-shaped first swinging member 40 is suppressed by the beam members 43. A holding member 44 is fixed to the two beam members 43. The holding member 44 supports the second motor M2. A pinion gear G2 is fixed to a distal end of the second motor M2. The rotational shaft of the second motor M2 is along the left-right direction LR. Two L-shaped plates 45 spaced apart in the front-rear direction FB are fixed to the upper wall portions 41*b* of the two support members 41, respectively. One rubber member 46 is attached to the L-shaped plate 45.

An L-shaped plate 47 is fixed to one of the two beam members 43. A gear portion g1 is fixed to the L-shaped plate 47. The teeth of the gear portion g1 are arranged in an arc shape along the left-right direction LR. The pitch-circle diameter of the gear portion g1 is substantially the same as the diameter of the arc-shaped rail portion 42. The gear portion g1 meshes with the pinion gear G1 rotated by the first motor M1 shown in FIG. 3. Thereby, the power of the first motor M1 is transmitted to the first swinging member 40. Therefore, the swing of the first direction D1 of the first swinging member 40 can be controlled by the first motor M1. For example, the swing of the first direction D1 of the first swinging member 40 can be controlled by the seat ECU controlling the first motor M1 in accordance with the acceleration of the vehicle detected by the main ECU that integrally controls the vehicle.

The upper roller 51, the lower rollers 52, and the side portion rollers 53 are the same members as the upper roller 21, the lower rollers 22, and the side portion rollers 23, respectively. The brackets 61*a*, 61*b* and 62 are the same members as the brackets 31*a*, 31*b* and 32, respectively. The beam members 43 and the holding member 44 are the same members as the beam members 13 and the holding member 14, respectively. The second motor M2 is the same as the first motor M1. The pinion gear G2 is the same member as the pinion gear G1. This reduces the number of types of components and reduces manufacturing costs.

Configuration of Second Swinging Member

Figure 5:
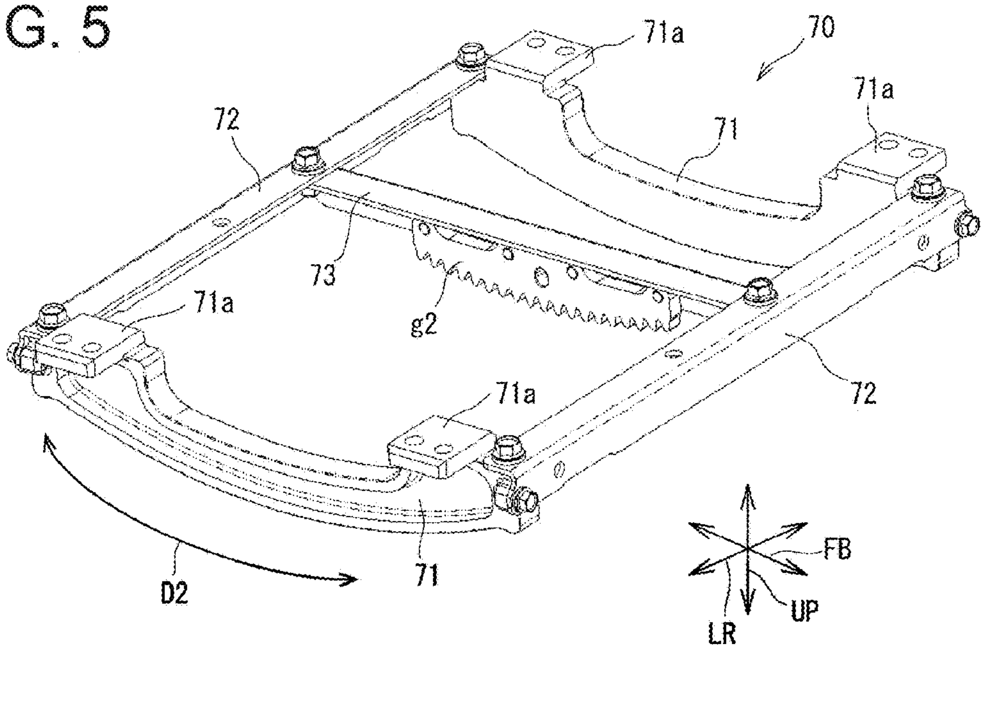
FIG. 5 is an external perspective view of the second swinging member.

FIG. 5 is an external perspective view of the second swinging member 70. The second swinging member 70 includes two rail portions 71 and two support members 72. The rail portions 71 and the support members 72 are made of metal, for example, but are not limited thereto. The two rail portions 71 are spaced apart from each other in the left-right direction LR and extend along the front-rear direction FB. Attachment portions 71*a* are provided at both ends of the rail portions 71. The seat S is fixed to the attachment portions 71*a*. The two support members 72 are spaced apart from each other in the front-rear direction FB and extend along the left-right direction LR. The two rail portions 71 and the two support members 72 are connected to each other such that the base member 10 has a frame shape.

Each of the two rail portions 71 extends in an arc shape along the second direction D2 shown in FIG. 1. The rail portions 71 are each swingably supported in the second direction D2 by one upper roller 51, two lower rollers 52, and two side portion rollers 53 shown in FIG. 4. The rail portion 71 is an example of a second rail portion. Further, when any one of the two support members 72 contacts the rubber member 46 shown in FIG. 4, the swing range of the second swinging member 70 in the second direction D2 with respect to the first swinging member 40 is defined.

Beam member 73 is attached between two support members 72. The beam member 73 is made of metal, for example, but is not limited thereto. The beam member 73 extends along the front-rear direction FB. Distortion of the frame-shaped second swinging member 70 is suppressed by the beam member 73. A gear portion g2 is fixed to the beam member 73. The teeth of the gear portion g2 are arranged in an arc shape along the front-rear direction FB. The pitch circle diameter of the rail portion 42 is substantially the same as the diameter of the arc-shaped rail portion 71. The gear portion g2 meshes with the pinion gear G2 which is rotated by the second motor M2 shown in FIG. 4. Thereby, the power of the second motor M2 is transmitted to the second swinging member 70. Therefore, the second motor M2 can control the swing of the second direction D2 of the second swinging member 70. For example, the swing of the second direction D2 of the second swinging member 70 can be controlled by the seat ECU controlling the second motor M2 in accordance with the acceleration of the vehicle detected by the main ECU that integrally controls the vehicle.

Figure 6:
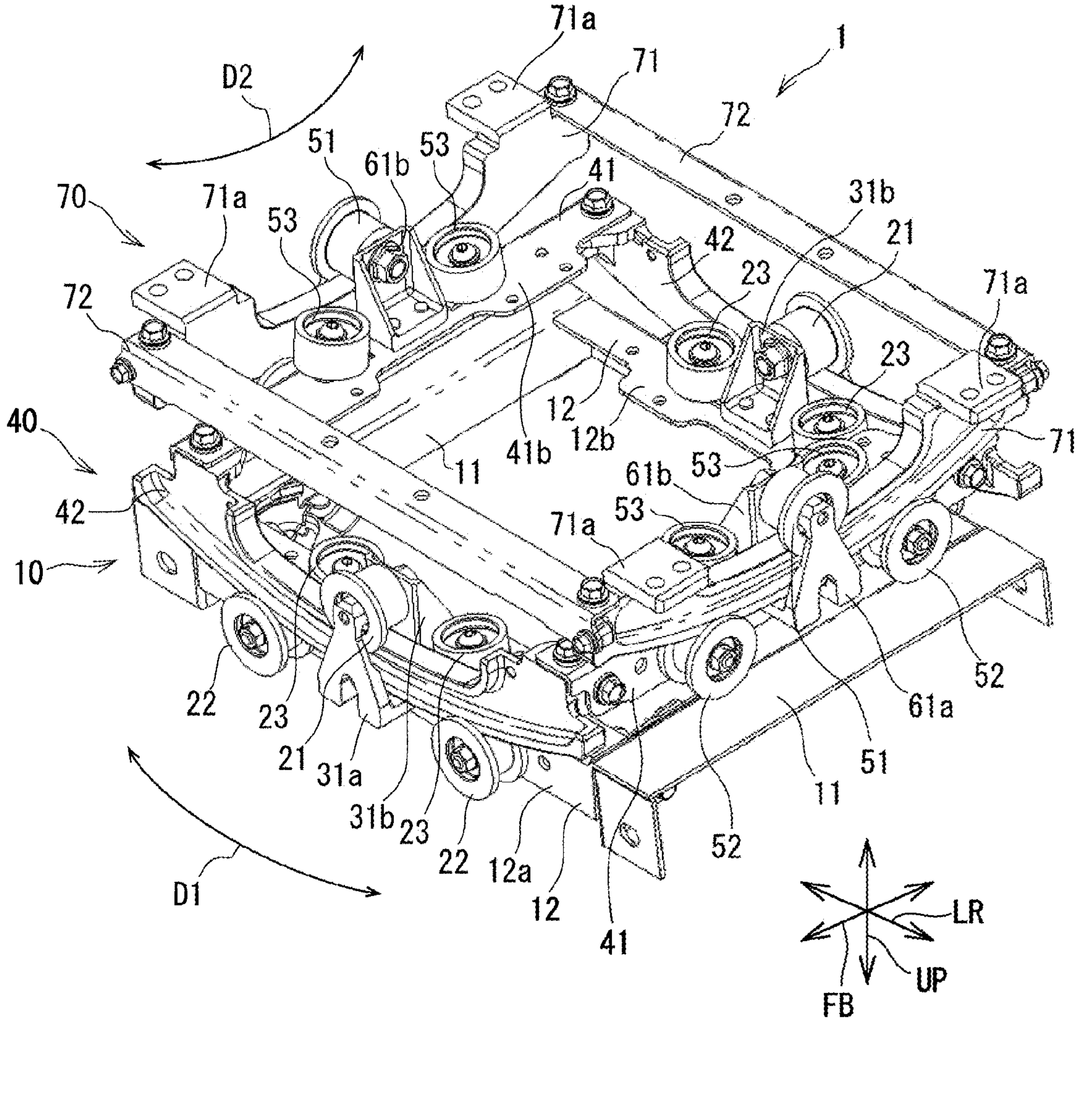
FIG. 6 is an external perspective view of the seat support device from which the first motor, the second motor, the beam member, and the like are removed.

FIG. 6 is an external perspective view of the seat support device 1 in which the first motor M1, the second motor M2, the beam members 13, 43, and 73, and the like are removed. The lower surface of the rail portion 42 is supported by two lower rollers 22. Similarly, the lower surface of the rail portion 71 is supported by two lower rollers 52. Here, the lower rollers 22 are in line contact with the rail portion 42, and the lower rollers 52 are in line contact with the rail portion 71. Therefore, for example, the contact area between the lower rollers 22 in line contact with the rail portion 42 and the rail portion 42 is larger than the contact area between the ball in point contact with the rail portion 42 and the rail portion 42. Therefore, the stress on the lower rollers 22 and the lower rollers 52 is smaller than the stress on the ball. Therefore, wear of the lower rollers 22 and 52 is suppressed more than that of such a ball. This stabilizes the swing of the first swinging member 40 and the second swinging member 70.

As described above, the lower surface of the rail portion 42 is supported by the two lower rollers 22, and the upper surface of the rail portion 42 is supported by the upper roller 21. As a result, the positional deviation of the first swinging member 40 with respect to the base member 10 in the vertical direction UP is restricted. Similarly, the lower surface of the rail portion 71 is supported by two lower rollers 52, and the upper surface of the rail portion 71 is supported by the upper roller 51. As a result, the positional deviation of the second swinging member 70 with respect to the first swinging member 40 in the vertical direction UP is restricted. Since the positional deviation in the vertical direction UP is restricted in this way, the swing of the first swinging member 40 and the second swinging member 70 is stabilized.

The inner side surface of the rail portion 42 is supported by two side portion rollers 23. As a result, the positional deviation of the first swinging member 40 with respect to the base member 10 in the front-rear direction FB is restricted. Similarly, the inner side surface of the rail portion 71 is supported by two side portion rollers 53. Thus, the positional deviation of the second swinging member 70 with respect to the first swinging member 40 in the left-right direction LR is restricted. Since the positional deviation is restricted in this way, the swing of the first swinging member 40 and the second swinging member 70 is stabilized.

Although flanges are formed at both ends of the lower rollers 22 and 52, the present disclosure is not limited thereto. Further, a flange is formed at one end of each of the upper rollers 21 and 51, but the present disclosure is not limited thereto.

As shown in FIG. 3, the first motor M1 is surrounded by the base member 10. Similarly, as shown in FIG. 4, the second motor M2 is surrounded by the first swinging member 40. Further, as shown in FIG. 6, the side portion roller 23 is located between the two rail portions 42, and the side portion rollers 53 are located between the two rail portions 71. As a result, the seat support device 1 is downsized.

The side portion rollers 23 may be positioned so as to sandwich the two rail portions 42 therebetween. By disposing the side portion rollers 23 on the outer sides of the two rail portions 42 in this manner, it is possible to secure a space surrounded by the base member 10 and in which the first motor M1 is disposed. Similarly, the side portion rollers 53 may be positioned so as to sandwich the two rail portions 71 therebetween. By arranging the side portion rollers 53 on the outer sides of the two rail portions 71, it is possible to secure a space surrounded by the first swinging member 40 and in which the second motor M2 is arranged.

Figure 7:
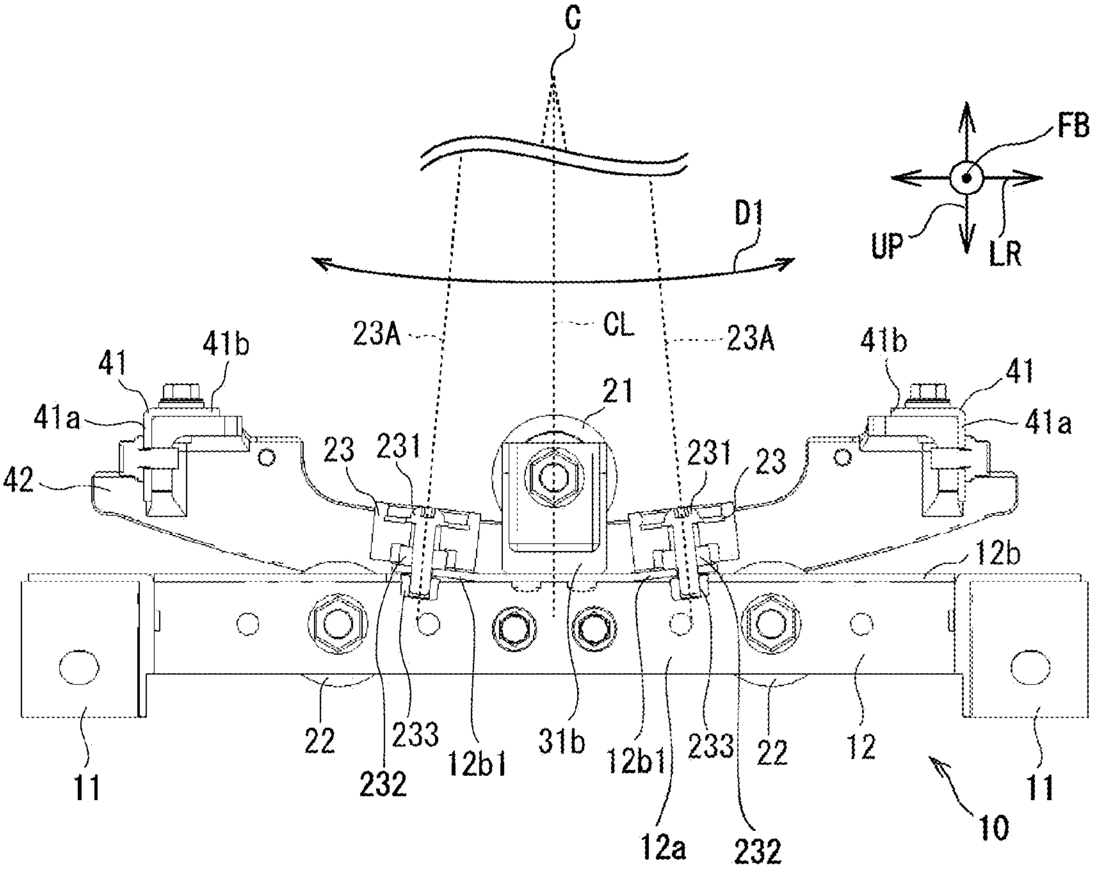
FIG. 7 is an explanatory view of a rail portion and a side portion roller.

FIG. 7 is an explanatory view of the rail portion 42 and the side portion roller 23. FIG. 7 is a view of the rail portion 42 and the base member 10 from the front-rear direction FB. In other words, FIG. 7 is a view of the rail portion 42 and the side portion roller 23 from a direction perpendicular to a plane including the first direction D1. FIG. 7 illustrates a predetermined position C, a center line CL, and an axial center 23A. The predetermined position C is the center of the first direction D1 which is the circular arc direction. The center line CL passes through the predetermined position C and passes through the center of the rail portion 42 at the first direction D1. The axial center 23A is the axial center of the side portion roller 23. In FIG. 7, the side portion roller 23 is shown in cross section.

The side portion rollers 23 are rotatably engaged with the bolts 231. Nuts 232 and 233 are screwed to the lower end portion side of the bolts 231. The nuts 232 and 233 sandwich the cut-out piece 12*b*1 of the upper wall portion 12*b* of the support member 12. The cut-out piece 12*b*1 is bent obliquely with respect to the upper wall portion 12*b* by cutting out a part of the upper wall portion 12*b*. As a result, the axial center 23A of the side portion roller 23 is inclined with respect to the center line CL.

The two side portion rollers 23 are retracted from the center line CL. The axial center 23A of the side portion roller 23 is inclined with respect to the center line CL so as to approach the predetermined position C along the axial center 23A so as to approach the center line CL. Specifically, the axial center 23A passes through the predetermined position C. Therefore, when the rail portion 42 swings in the first direction D1 with respect to the side portion roller 23, the rail portion 42 is prevented from sliding on the outer peripheral surface of the side portion roller 23. As a result, the sliding noise is suppressed, and the wear of the side surface of the rail portion 42 and the outer peripheral surface of the side portion roller 23 is also suppressed. Note that the same applies to the rail portions 71 and the side portion rollers 53, and the sliding noise is suppressed, and the wear of the rail portions 71 and the side portion rollers 53 is suppressed.

MODIFICATIONS

Figure 8A:
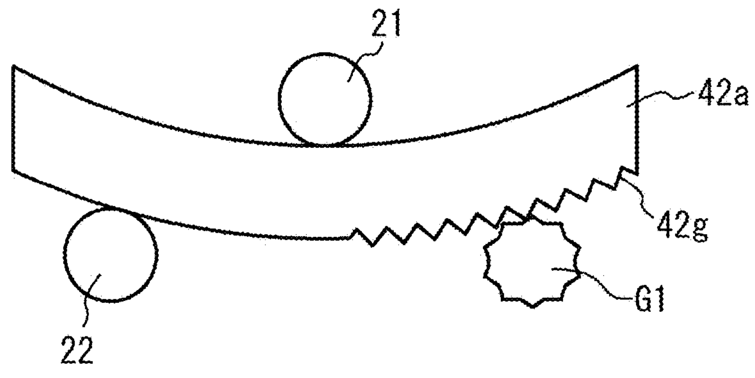
FIG. 8A is a schematic view of a modification of a transmission mechanism of power from the first motor to the first swinging member.
Figure 8B:
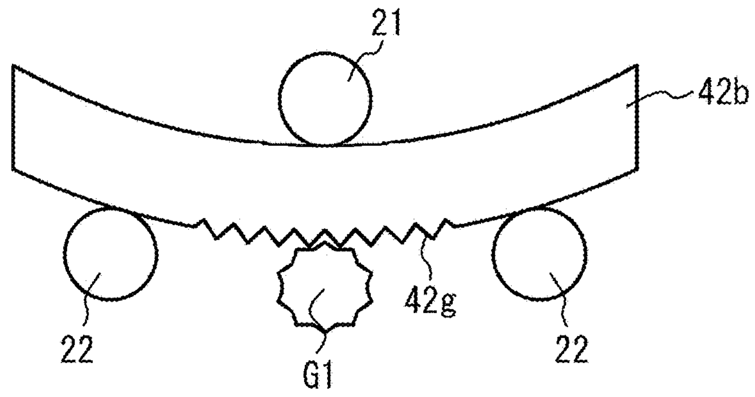
FIG. 8B is a schematic view of a modification of a power transmission device that transmits power from a first motor to a first swinging member.
Figure 8C:
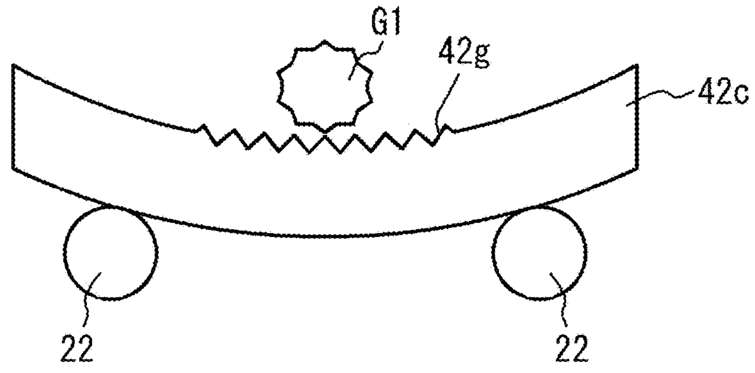
FIG. 8C is a schematic view of a modification of the transmission mechanism of the power from the first motor to the first swinging member.

FIGS. 8A to 8C are schematic views of a modification of the power transmission unit from the first motor M1 to the first swinging member 40. In the above-described embodiment, as shown in FIG. 4, the rail portion 42 and the gear portion g1 are provided separately. In contrast, in the embodiment shown in FIG. 8A, the gear portion 42*g* is provided in the lower one-side area of the rail portion 42*a*. As the pinion gear G1 meshes with the gear portion 42*g*, the pinion gear G1 also functions as a lower roller that supports the lower portion of the rail portion 42*a*. In this way, the number of components is suppressed.

In the embodiment shown in FIG. 8B, the gear portion 42*g* is provided near the center of the lower portion of the rail portion 42*b*. The pinion gear G1 supports the lower portion of the rail portion 42*b* between the two lower rollers 22. As a result, the rail portion 42*b* is stably supported.

In the example shown in FIG. 8C, the gear portion 42*g* is formed on the upper side of the rail portion 42*c*. As the pinion gear G1 meshes with the gear portion 42*g*, the pinion gear G1 also functions as an upper roller that supports the upper portion of the rail portion 42*c*. In this way, the number of components is suppressed.

In the above embodiment, the base member 10 supports the upper roller 21, the lower rollers 22, and the side portion rollers 23, and the first swinging member 40 has rail portions 42 that are swingably supported by these rollers. For example, the base member 10 may have a rail portion, and the first swinging member 40 may support a plurality of rollers that roll with respect to the rail portion. In the above embodiment, the first swinging member 40 supports the upper roller 51, the lower rollers 52, and the side portion rollers 53, and the second swinging member 70 has rail portions 71 that are swingably supported by these rollers. For example, the first swinging member 40 may have a rail portion, and the second swinging member 70 may support a plurality of rollers that roll with respect to the rail portion.

In the above embodiment, the upper portion of the rail portion 42 is supported by one upper roller 21, but may be supported by a plurality of upper rollers. In the above embodiment, the lower portion of the rail portion 42 is supported by two lower rollers 22, but may be supported by three or more lower rollers. In the above embodiment, the side portion of the rail portion 42 is supported by two side portion rollers 23, but may be supported by one side portion roller, or may be supported by three or more side portion rollers 23. The same applies to the rail portions 71, the upper roller 51, the lower rollers 52, and the side portion rollers 53.

Although the embodiments of the present disclosure have been described in detail above, the present disclosure is not limited to such specific embodiments, and various modifications and changes can be made within the scope of the gist of the present disclosure described in the claims.

What is claimed is:

1. A seat support device, comprising:

a base member;

a first swinging member; and a second swinging member to which a seat of a vehicle is fixed, wherein one of the base member and the first swinging member includes two first rail portions each first rail portion of the two first rail portions extending in an arc shape along a first direction, the other of the base member and the first swinging member rotatably supports a plurality of first rollers, the plurality of first rollers being in rolling contact with the two first rail portions, and the two first rail portions and the plurality of first rollers being configured to support the first swinging member with respect to the base member such that the first swinging member is swingable relative to the base member in the first direction, one of the first swinging member and the second swinging member includes two second rail portions each second rail portion of the two second rail portions extending in an arc shape along a second direction different to the first direction, the other of the first swinging member and the second swinging member rotatably supports a plurality of second rollers, the plurality of second rollers being in rolling contact with the two second rail portions, and the two second rail portions and the plurality of second rollers being configured to support the second swinging member with respect to the first swinging member such that the second swinging member is swingable relative to the first swinging member in the second direction, the plurality of first rollers includes rollers that respectively support a lower portion, an upper portion, and a side portion of each of the two first rail portions, and the plurality of second rollers includes rollers that respectively support a lower portion, an upper portion, and a side portion of each of the two second rail portions.

2. The seat support device according to claim 1, further comprising:

a first motor supported by the base member; and a second motor supported by the first swinging member, wherein the first swinging member includes a first gear portion to which power is transmitted from the first motor and that extends along the first direction, and the second swinging member includes a second gear portion to which power is transmitted from the second motor and that extends along the second direction.

3. The seat support device according to claim 2, wherein:

the base member has a frame shape defined by a plurality of members connected to surround a first inner space;

the first swinging member has a frame shape defined by a plurality of members connected to surround a second inner space;

the first motor is disposed in the first inner space surrounded by the base member;

the second motor is disposed in the second inner space surrounded by the first swinging member;

first rollers that respectively support the side portions of the two first rail portions are positioned between the two first rail portions or are positioned such that the first rollers sandwich the two first rail portions; and second rollers that respectively support the side portions of the two second rail portions are positioned between the two second rail portions or are positioned such that the second rollers sandwich the two second rail portions.

4. The seat support device according to claim 1, wherein the first rollers include a side portion roller that supports the side portion of the first rail portion, the first direction is a circular arc direction centered on a prescribed position, and when the first rail portion and the side portion roller are seen from a direction orthogonal to a surface that includes the first direction, the side portion roller is retracted from a center line that passes through a center of the first rail portion and the prescribed position in the first direction, and an axial center of the side portion roller is inclined with respect to the center line so as to approach the center line with an approach to the prescribed position along the axial center.

5. The seat support device according to claim 1, wherein:

the base member rotatably supports the first rollers;

the first swinging member includes the two first rail portions and rotatably supports the second rollers; and the second swinging member includes the two second rail portions.

* * * * *